(12) United States Patent
Witham et al.

(10) Patent No.: US 10,315,944 B2
(45) Date of Patent: Jun. 11, 2019

(54) POLYMERIC FLOCCULANTS FOR TREATING AQUEOUS MINERAL SUSPENSIONS

(71) Applicant: Dow Global Technologies LLC, Midland, MI (US)

(72) Inventors: Cole A. Witham, Pearland, TX (US); Matthew J. Hansen, Midland, MI (US); James E. Hitt, Midland, MI (US); Carol E. Mohler, Midland, MI (US); Michael K. Poindexter, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 283 days.

(21) Appl. No.: 15/303,588

(22) PCT Filed: Apr. 30, 2015

(86) PCT No.: PCT/US2015/028467
§ 371 (c)(1),
(2) Date: Oct. 12, 2016

(87) PCT Pub. No.: WO2015/168378
PCT Pub. Date: Nov. 5, 2015

(65) Prior Publication Data
US 2017/0036939 A1    Feb. 9, 2017

Related U.S. Application Data

(60) Provisional application No. 61/986,131, filed on Apr. 30, 2014.

(51) Int. Cl.
| | | |
|---|---|---|
| *C02F 11/14* | (2019.01) | |
| *C10G 1/04* | (2006.01) | |
| *C02F 1/56* | (2006.01) | |
| *C08G 77/14* | (2006.01) | |
| *C02F 103/10* | (2006.01) | |
| *C08G 65/22* | (2006.01) | |
| *C08G 77/46* | (2006.01) | |

(52) U.S. Cl.
CPC ............. *C02F 11/14* (2013.01); *C02F 1/56* (2013.01); *C10G 1/04* (2013.01); *C02F 2103/10* (2013.01); *C08G 65/22* (2013.01); *C08G 77/14* (2013.01); *C08G 77/46* (2013.01)

(58) Field of Classification Search
None
See application file for complete search history.

(56) References Cited

U.S. PATENT DOCUMENTS

| | | |
|---|---|---|
| 2,969,402 A | 1/1961 | Hill et al. |
| 3,037,943 A | 6/1962 | Hill et al. |
| 3,627,702 A | 12/1971 | Gehm et al. |
| 4,193,892 A | 3/1980 | Goeke et al. |
| 4,267,309 A | 5/1981 | Goeke et al. |
| 4,342,653 A | 8/1982 | Halverson |
| 4,667,013 A | 5/1987 | Reichle |
| 4,678,585 A | 7/1987 | Brownrigg |
| 4,704,209 A | 11/1987 | Richardson et al. |
| 4,931,190 A | 6/1990 | Laros |
| 5,104,551 A | 4/1992 | Davis et al. |
| 6,383,282 B1 | 5/2002 | Chaiko |
| 6,979,722 B2 | 12/2005 | Hamamoto et al. |
| 7,901,583 B2 | 3/2011 | McColl et al. |
| 9,174,860 B2 | 11/2015 | Franks et al. |
| 2008/0111103 A1* | 5/2008 | Heitner .......... C02F 5/10 252/181 |
| 2008/0257827 A1* | 10/2008 | Dai .......... B03D 3/06 210/729 |
| 2010/0081781 A1* | 4/2010 | Schubert .......... C08G 65/22 528/14 |

FOREIGN PATENT DOCUMENTS

| | | | |
|---|---|---|---|
| WO | 2011070218 | 6/2011 | |
| WO | WO-2013029764 A2 * | 3/2013 | ............ D21C 9/02 |
| WO | 2013116027 | 8/2013 | |

OTHER PUBLICATIONS

Li, et al., Energy & Fuels, 2005, vol. 19, pp. 936-943.

* cited by examiner

*Primary Examiner* — Clare M Perrin

(57) ABSTRACT

The present invention relates to a method of dewatering an aqueous mineral suspension comprising introducing into the suspension a flocculating system comprising a poly(ethylene oxide) copolymer, in particular a copolymer of ethylene oxide and one or more silane- or siloxane-functionalized glycidyl ether monomer. Said poly(ethylene oxide) copolymers are useful for the treatment of suspensions of particulate material, especially waste mineral slurries. The invention is particularly suitable for the treatment of tailings and other waste material resulting from mineral processing, in particular, the processing of oil sands tailings.

4 Claims, No Drawings

POLYMERIC FLOCCULANTS FOR TREATING AQUEOUS MINERAL SUSPENSIONS

FIELD OF THE INVENTION

The present invention relates to polymeric flocculants, specifically poly(ethylene oxide) copolymers comprising ethylene oxide and a silane- or siloxane-functionalized glycidyl ether monomer, and use thereof for the treatment of suspensions of particulate material, especially waste mineral slurries. The invention is particularly suitable for the treatment of tailings and other waste material resulting from mineral processing, in particular, processing of oil sands tailings.

BACKGROUND OF THE INVENTION

Processes that treat mineral ores in order to extract mineral values including in some cases the recovery of hydrocarbons will normally result in waste material. Often the waste material consists of an aqueous slurry or sludge comprising particulate mineral material, for instance clay, shale, sand, grit, metal oxides, etc. admixed with water and possibly residual hydrocarbons.

In some cases the waste material such as mine tailings can be conveniently disposed of in an underground mine to form backfill. For other applications it may not be possible to dispose of the waste in a mine. In these instances, it is common practice to dispose of this material by pumping the aqueous slurry to open mines, pits, lagoons, heaps or stacks and allowing it to dewater gradually through the actions of sedimentation, drainage, evaporation, and consolidation.

There is a great deal of environmental pressure to minimize the allocation of new land for disposal purposes and to more effectively use the existing waste areas. Generally, the goal of oil sands tailings remediation is to recover water to be reused in the process and obtain solids that are dry enough so as to be trafficable so that the dried tailings/solids can be used to reclaim land. The exact requirements needed for final land reclamation and restoration will often be governed by regional or national mandates.

One method is to load multiple layers of waste onto an area to thus form higher stacks of waste. However, this presents a difficulty of ensuring that the waste material can only flow over the surface of previously consolidated waste within acceptable boundaries, is allowed to rigidify to form a stack, and that the waste is sufficiently consolidated to support multiple layers of consolidated material, without the risk of collapse or slip. Thus the requirements for providing a waste material with the right sort of characteristics for stacking is altogether different from those required for other forms of disposal, such as back-filling within a relatively enclosed area.

In a typical mineral processing operation, waste solids are separated from materials that contain mineral values in an aqueous process. The mined material may also encompass the recovery of hydrocarbons. The aqueous suspension of waste solids often contains clays and other minerals, and is usually referred to as tailings. This is true in a variety of mineral solids including tailings from oil sands. These solids can be concentrated by a flocculation process in a thickener to give a higher density underflow and to recover some of the process water. It is usual to pump the underflow to a surface holding area, often referred to as a tailings pit or dam. Other ways to treat the flocculated solids include, for example, thin-lift which involves depositing on a slope with dewatering and evaporation, deep-pit, filter presses, belt presses, or centrifuges.

Once deposited at this surface holding area, water will continue to be released from the aqueous suspension resulting in further concentration of the solids over a period of time. Once a sufficient volume of water has been collected this is usually pumped back to the mineral processing plant. Once the solids content is high enough in the dewatered solids, land reclamation becomes possible.

Sometimes the solids content is not high enough after a first treatment and tailings may need to be retreated to further increase its solid content.

Flocculants are also used to treat legacy tailings, sometimes referred to as mature fine tailings (MFT), such as those collected and concentrated in ponds.

The prior art contains numerous references to flocculation processes and various proposed flocculating agents, for example see U.S. Pat. No. 7,901,583.

Polymeric flocculants include polymers of sodium acrylate, for example see U.S. Pat. No. 4,342,653 and sulfonate polymers, for example see U.S. Pat. No. 4,704,209.

Polymers of acrylamide are commonly employed as flocculating agents. However, acrylamides suffer from various disadvantages, for instance, rapid hydrolyzation in alkaline solutions which makes them impractical for use in various applications that involve alkaline solutions, sensitivity to treatment dosage levels which makes it easy to under or overdose, floc shear instability, and/or floc structures which do not allow for complete dewatering.

U.S. Pat. No. 4,678,585 describes flocculating red mud suspensions in the Bayer alumina process using homopolymers of acrylic acid or sodium acrylate or copolymers of acrylic acid or acrylate with acrylamide.

Li, et al., Energy & Fuels, 2005, vol. 19, pp. 936-943 disclose the effect of a hydrolyzed polyacrylamide (HPAM) on bitumen extraction and tailings treatment of oil sands ores. Careful control of HPAM dosage is necessary to achieve efficiency in both bitumen extraction and in flocculation of solid fines.

Polymers of polyethylene oxide are commonly employed as flocculating agents, for example see U.S. Pat. Nos. 4,931,190; 5,104,551; 6,383,282; and WO 2011070218. A primary disadvantage of such use of polymers of polyethylene oxide is that they produce small floc structures. US Publication No. 20120160776 discloses stimulant-sensitive flocculation using a polyethylene oxide/polypropylene block copolymer.

In spite of the numerous polymeric flocculating agents, there is still a need for a flocculating agent to further improve consolidation of suspensions of materials as well as further improve upon the dewatering of suspensions of waste solids that have been transferred as a fluid or slurry to a settling area for disposal. In particular, it would be desirable to provide a more effective treatment of waste suspensions, such as oil sands tailings, transferred to disposal areas ensuring fast, efficient concentration, and more environmentally friendly storage of solids and improved clarity of released water.

BRIEF SUMMARY OF THE INVENTION

The present invention is a poly(ethylene oxide) copolymer which is the reaction product of polymerizing from 95 to 5 weight percent ethylene oxide and from 5 to 95 weight percent of one or more silane- or siloxane-functionalized glycidyl ether monomer in the presence of a zinc alkoxide catalyst or a modified alkaline earth hexammine catalyst, preferably a modified calcium hexammine catalyst wherein the silane- or siloxane-functionalized glycidyl ether monomer is described by one or more of the following structures:

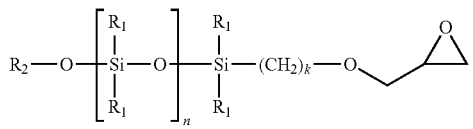

I wherein $R_1$ is —$CH_3$ or —$OCH_3$,
$R_2$ is —$CH_3$ or —$CH_2CH_3$ or —$Si(CH_3)_3$
k is equal to 1 to 4,
and
n is equal to 1 to 50;

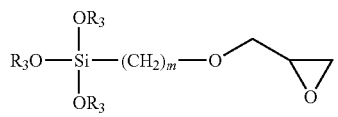

II wherein $R_3$ is —$CH_3$ or —$CH_2CH_3$
and
m is equal to 1 to 4;
or

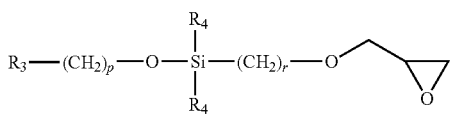

III wherein $R_3$ and $R_4$ is independently —$CH_3$ or —$CH_2CH_3$,
p is equal to 0 to 2,
and
r is equal to 1 to 4.

In one embodiment of the present invention the silane- or siloxane-functionalized glycidyl ether monomer of the poly(ethylene oxide) copolymer disclosed herein above is 3-glycidyloxypropyl polydimethy siloxane wherein n is 1 to 50; 3-glycidyloxypropyl trimethoxysilane; or 3-glycidoxypropyldimethylethoxysilane.

Another embodiment of the present invention is a method of dewatering an aqueous suspension of particulate material comprising the steps of:
   i. adding to an aqueous suspension of particulate material the poly(ethylene oxide) copolymer described herein above;
   ii. allowing the suspension to flocculate;
   and
   dewatering the suspension.

In the method disclosed herein above, the aqueous suspension of particulate material preferably comprises tailings and other waste material resulting from the mineral processing of phosphate, diamond, gold, mineral sands, zinc, lead, copper, silver, uranium, nickel, iron ore, coal, or red mud, most preferably tailings and other waste material resulting from the processing of oil sands.

DETAILED DESCRIPTION OF THE INVENTION

According to the present invention, we provide a method of dewatering an aqueous mineral suspension comprising introducing into the suspension a flocculating system comprising a poly(ethylene oxide) copolymer. The poly(ethylene oxide) copolymer of the present invention may be applied to an aqueous suspension of the particulate mineral material as it is transferred as a fluid to the deposition area, an intermediate treatment area and/or once it has been transferred to the deposition area. By deposition area we mean any area where the aforementioned particulate material can be deposited. This can for instance be any area where waste is deposited from a mineral processing operation. Alternatively, it may be any area that has been excavated, for instance to extract useful material e.g. mineral values including bitumen and in which the excavated area is filled with particulate material treated according to the invention.

Suspended solids may be concentrated in a thickener and this material will for instance leave the thickener as an underflow which will be pumped along a conduit to a deposition area. The conduit can be any convenient means for transferring the material to the deposition area and may for instance be a pipe or a trench. The material remains fluid and pumpable during the transfer stage until the material is allowed to stand. Other means of mechanical treatment include the use of thin-lift deposition, filter presses, belt presses and/or centrifuges.

In one embodiment, the process of the invention is part of the mineral processing operation in which an aqueous suspension of waste solids is optionally flocculated in a vessel to form a supernatant layer comprising an aqueous liquor and an underflow layer comprising thickened solids which form the material. The supernatant layer will be separated from the under flow in the vessel and typically recycled or subjected to further processing. The aqueous suspension of waste solids or optionally, the thickened underflow is transferred, usually by pumping, to a deposition area, which may for instance be a tailings pit, dam, or pond.

The material may consist of only mainly fine particles, or a mixture of fine and coarse particles. Once the material has reached the deposition area it is allowed to settle and dewater and in addition preferably consolidation takes place. The copolymer may be added to the material in an effective amount at any convenient point, typically during transfer. In some cases the aqueous suspension may be transferred first to a holding vessel before being transferred to the deposition area. After deposition of the suspension of particulate mineral material it will dewater to form a dewatered solid. Preferably the dewatered suspension of particulate mineral material will form a compact and dry solid mass through the combined actions of sedimentation, drainage, evaporative drying, and consolidation.

The deposited particulate mineral material will reach a substantially dry state. In addition the particulate mineral material will typically be suitably consolidated and firm e.g. due to simultaneous settling and dewatering to enable the land to bear significant weight.

Suitable doses of the poly(ethylene oxide) copolymer range from 10 grams to 10,000 grams per ton of material solids. Generally the appropriate dose can vary according to the particular material and material solids content. Preferred doses are in the range 30 to 7,500 grams per ton, more preferably 100 to 3,000 grams per ton, while even more preferred doses are in the range of from 500 to 3,000 grams per ton. The poly(ethylene oxide) copolymer may be added to the suspension of particulate mineral material, e.g. the tailings slurry, in solid particulate form, an aqueous solution that has been prepared by dissolving the poly(ethylene oxide) copolymer into water or an aqueous-based medium, or a suspended slurry in a solvent.

The mineral material particles are usually inorganic. Typically the material may be derived from or contain filter cake, tailings, thickener underflows, or unthickened plant waste streams, for instance other mineral tailings, slurries, or slimes, including phosphate, diamond, gold slimes, mineral sands, tails from zinc, lead, copper, silver, uranium, nickel, iron ore processing, coal, oil sands or red mud. The material may be solids settled from the final thickener or wash stage of a mineral processing operation. Thus the material desirably results from a mineral processing operation. Preferably the material comprises tailings. Preferably the mineral material would be hydrophilic and/or bi-wettable in nature and more preferably selected from red mud and tailings containing hydrophilic clay, such as oil sands tailings etc.

The fine tailings or other material which is pumped may have a solids content in the range 5 percent to 80 percent by weight. The slurries are often in the range 15 percent to 70 percent by weight, for instance 25 percent to 40 percent by weight. The sizes of particles in a typical sample of the fine tailings are substantially all less than 45 microns, for instance about 95 percent by weight of material is particles less than 20 microns and about 75 percent is less than 10 microns. The coarse tailings are substantially greater than 45 microns, for instance about 85 percent is greater than 100 microns but generally less than 10,000 microns. The fine tailings and coarse tailings may be present or combined together in any convenient ratio provided that material remains pumpable.

The dispersed particulate solids may have a unimodal, bimodal, or multimodal distribution of particle sizes. The distribution will generally have a fine fraction and a coarse fraction, in which the fine fraction peak is substantially less than 45 microns and the coarse (or non-fine) fraction peak is substantially greater than 45 microns.

We have found better results are obtained in terms of dewatering and consolidation when the material is relatively concentrated and homogenous. It may also be desirable to combine the addition of the copolymer with other additives. For instance, the flow properties of the material through a conduit may be facilitated by including an inorganic or organic coagulant. Typically where a coagulant is included it would be included in conventional amounts. We have found that surprisingly the presence of coagulants or other additives does not impair the dewatering, and consolidation of the material or indeed the rehabilitation of the area into which it is deposited.

Additionally, the copolymers of the present invention may be used in conjunction with other types of flocculants (e.g. polyacrylates, polyacrylamides, partially-hydrolyzed polyacrylamides, etc.). The combinations of treatment chemicals can involve sequential additions or simultaneous addition to the slurry in need of treatment.

Typically the suspension of particulate mineral material may be transferred along a conduit and through an outlet to the deposition area. The suspension of particulate mineral material will then be allowed to dewater at the deposition area. Preferably the suspension of particulate material that has been transferred to the deposition area will also consolidate upon standing. In many cases the deposition area will already contain consolidated mineral material. Suitably the suspension of particulate mineral material upon reaching the deposition area will flow on the surface of previously consolidated mineral material and the material will be allowed to stand and consolidate to form a stack.

Preferably the material will be pumped as a fluid to an outlet at the deposition area and the material allowed to flow over the surface of consolidated material. The material is allowed to stand and consolidate and therefore forming a stack of consolidated material. This process may be repeated several times to form a stack that comprises several layers of consolidated material. The formation of stacks of consolidated material has the advantage that less area is required for disposal.

In a mineral processing operation where a suspension containing solids is flocculated in a thickener in order to separate the suspension into a supernatant layer and an underflow material, the material can typically be treated at any suitable point before treatment in a thickener and/or after flocculation in the thickener but before the material is allowed to stand. Typically the suspension is transferred along a conduit to a deposition area. This is normally achieved by pumping the suspension of particulate mineral material. A suitable and effective dewatering amount of the copolymer can be mixed with the material prior to or during a pumping stage. In this way the copolymer can be distributed throughout the material.

Alternatively, the poly(ethylene oxide) copolymer can be introduced and mixed with the material subsequently to a pumping stage. The most effective point of addition will depend upon the substrate and the distance from the thickener to the deposition area. If the conduit is relatively short it may be advantageous to dose the copolymer solution close to where the material flows from the thickener. On the other hand, where the deposition area is significantly remote from the thickener in may be desirable to introduce the copolymer solution closer to the outlet. In some instances in may be convenient to introduce the copolymer into the material as it exits the outlet. Frequently it may be desirable to add the poly(ethylene oxide) copolymer to the suspension before it exits the outlet, preferably within 10 meters of the outlet. For slurries taken from a tailings pond, treatment can be made via in-line addition of flocculant to the flowing slurry. The treated material can then be sent to a pit, sloped surface or further treated in a filter press, belt press or centrifuge before placement in a disposal area.

The rheological characteristics of the material as it flows through the conduit to the deposition area is important, since any significant reduction in flow characteristics could seriously impair the efficiency of the process. It is important that there is no significant settling of the solids as this could result in a blockage, which may mean that the plant has to be closed to allow the blockage to be cleared. In addition it is important that there is no significant reduction in flow characteristics, since this could drastically impair the pumpability of the material. Such a deleterious effect could result in significantly increased energy costs as pumping becomes harder and the likelihood of increased wear on the pumping equipment.

The rheological characteristics of the suspension of particulate mineral material as it dewaters is important, since once the material is allowed to stand it is important that flow is minimized and that ideally solidification and preferably consolidation of the material proceeds rapidly. If the material is too fluid then it will not form an effective stack and there is also a risk that it will contaminate water released from the material. It is also desirable that the consolidated material is sufficiently strong to remain intact and withstand the weight of subsequent layers of consolidated material being applied to it.

Preferably the process of the invention will achieve a heaped disposal geometry and will co-immobilize the treated fine and course fractions of the solids in the material. The heaped geometry appears to give a higher downward compaction pressure on underlying solids which seems to be responsible for enhancing the rate of dewatering. We find that this geometry results in a greater amount of waste per surface area, which is both environmentally and economically beneficial.

A preferred feature of the present invention is the consolidation during the release of aqueous liquor that preferably occurs during the dewatering step. Thus in a preferred form of the invention the material is dewatered during consolidation to release liquor containing significantly less solids. The liquor can then be returned to the process thus reducing the volume of imported water required and therefore it is important that the liquor is clear and substantially free of contaminants, especially migrating particulate fines. Suitably, the liquor may for instance be recycled to the thickener from which the material is separated as an underflow.

The flocculation agent of the present invention is added directly to the above mentioned suspension of particulate material. The flocculant may be in a substantially dry form or preferably added as an aqueous solution.

The flocculant of the present invention comprises a poly(ethylene oxide) copolymer. The poly(ethylene oxide) copolymer is the reaction product comprising ethylene oxide and one or more of a silane- or siloxane-functionalized glycidyl ether comonomer having one of the following formulas:

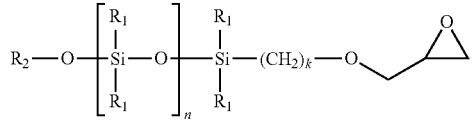

I wherein $R_1$ is —$CH_3$ or —$OCH_3$,
$R_2$ is —$CH_3$ or —$CH_2CH_3$ or —$Si(CH_3)_3$
k is equal to 1 to 4,
and
n is equal to 1 to 50;

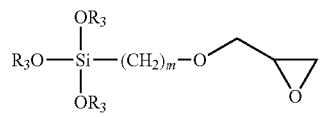

II wherein $R_3$ is —$CH_3$ or —$CH_2CH_3$
and
m is equal to 1 to 4;

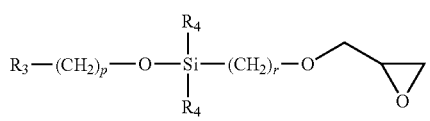

III wherein $R_3$ and $R_4$ is independently is —$CH_3$ or —$CH_2CH_3$,
p is equal to 0 to 2,
and
r is equal to 1 to 4;
or mixtures thereof.

Preferred silane- or siloxane-functionalized glycidyl ether monomers are 3-glycidyloxypropyl polydimethy siloxane wherein n is 1 to 50; 3-glycidyloxypropyl trimethoxysilane; and 3-glycidoxypropyldimethylethoxysilane represented by the following formulas, respectively:

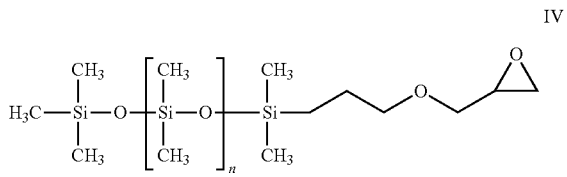

IV wherein n is equal to 1 to 50,

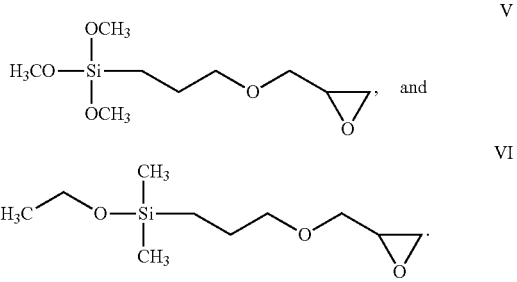

V and

VI

In one embodiment of the present invention, the poly(ethylene oxide) copolymer may comprise other monomers in addition to the ethylene oxide and one or more silane- or siloxane-functionalized glycidyl ether comonomer. For example, epoxides containing only alkyl or aryl substituents.

A preferred additional comonomer is 1,2-epoxy tetradecane:

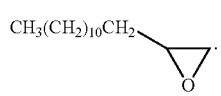

VII

Poly(ethylene)oxide polymers and methods to make said polymers are known, for example see WO 2013116027. In one embodiment of the present invention, a zinc catalyst, such as disclosed in U.S. Pat. No. 4,667,013, can be employed to make the poly(ethylene oxide) copolymers of the present invention. In a preferred embodiment the catalyst used to make the poly(ethylene oxide) copolymers of the present invention is a calcium catalyst such as those disclosed in U.S. Pat. Nos. 2,969,402; 3,037,943; 3,627,702; 4,193,892; and 4,267,309, all of which are incorporated by reference herein in their entirety.

A preferred zinc catalyst is a zinc alkoxide catalyst as disclosed in U.S. Pat. No. 6,979,722, which is incorporated by reference herein in its entirety.

A preferred alkaline earth metal catalyst is referred to as a "modified alkaline earth hexammine" or a "modified alkaline earth hexammoniate" the technical terms "ammine"

and "ammoniate" being synonymous. A modified alkaline earth hexammine useful for producing the poly(ethylene oxide) copolymer of the present invention is prepared by admixing at least one alkaline earth metal, preferably calcium metal, strontium metal, or barium metal, zinc metal, or mixtures thereof, most preferably calcium metal; liquid ammonia; an alkylene oxide; which is optionally substituted by aromatic radicals, and an organic nitrite having at least one acidic hydrogen atom to prepare a slurry of modified alkaline earth hexammine in liquid ammonia; continuously transferring the slurry of modified alkaline earth hexammine in liquid ammonia into a stripper vessel and continuously evaporating ammonia, thereby accumulating the modified catalyst in the stripper vessel; and upon complete transfer of the slurry of modified alkaline earth hexammine into the stripper vessel, aging the modified catalyst to obtain the final polymerization catalyst. In a preferred embodiment of the alkaline earth metal catalyst of the present invention described herein above, the alkylene oxide is propylene oxide and the organic nitrite is acetonitrile.

A catalytically active amount of alkaline earth metal catalyst is used in the process to make the poly(ethylene oxide) copolymer of the present invention, preferably the catalysts is used in an amount of from 0.0004 to 0.0040 g of alkaline earth metal per gram of epoxide monomers (combined weight of all monomers, e.g., ethylene oxide and silane- or siloxane-functionalized glycidyl ether monomers), preferably 0.0007 to 0.0021 g of alkaline earth metal per g of epoxide monomers, more preferably 0.0010 to 0.0017 g of alkaline earth metal per g of epoxide monomers, and most preferably 0.0012 to 0.0015 g of alkaline earth metal per g of epoxide monomer.

The catalysts may be used in dry or slurry form in a conventional process for polymerizing an epoxide, typically in a suspension polymerization process. The catalyst can be used in a concentration in the range of 0.02 to 10 percent by weight, such as 0.1 to 3 percent by weight, based on the weight of the epoxide monomers feed.

The polymerization reaction can be conducted over a wide temperature range. Polymerization temperatures can be in the range of from −30° C. to 150° C. and depends on various factors, such as the nature of the epoxide monomer(s) employed, the particular catalyst employed, and the concentration of the catalyst. A typical temperature range is from 0° C. to 150° C.

The pressure conditions are not specifically restricted and the pressure is set by the boiling points of the diluent and comonomers used in the polymerization process.

In general, the reaction time will vary depending on the operative temperature, the nature of the silane- or siloxane-functionalized glycidyl ether monomer employed, the particular catalyst and the concentration employed, the use of an inert diluent, and other factors. Polymerization times can be run from minutes to days depending on the conditions used. Preferred times are 1 h to 10 h.

The ethylene oxide may be present from 5 weight percent to 95 weight percent and the silane- or siloxane-functionalized glycidyl ether monomer may be present from 5 to 95 weight percent, based on the total weight of said copolymer. If two or more silane- or siloxane-functionalized glycidyl ether monomers are used, the combined weight percent of the two or more silane- or siloxane-functionalized glycidyl ether monomers is from 5 to 95 weight percent based on the total weight of said poly(ethylene oxide) copolymer.

The polymerization reaction preferably takes place in the liquid phase. Typically, the polymerization reaction is conducted under an inert atmosphere, e.g. nitrogen. It is also highly desirable to affect the polymerization process under substantially anhydrous conditions. Impurities such as water, aldehyde, carbon dioxide, and oxygen which may be present in the epoxide feed and/or reaction equipment should be avoided. The poly(ethylene oxide) copolymers of this invention can be prepared via the bulk polymerization, suspension polymerization, or the solution polymerization route, suspension polymerization being preferred.

The polymerization reaction can be carried out in the presence of an inert organic diluent such as, for example, aromatic hydrocarbons, benzene, toluene, xylene, ethylbenzene, and chlorobenzene; various oxygenated organic compounds such as anisole, the dimethyl and diethyl ethers of ethylene glycol, of propylene glycol, and of diethylene glycol; normally-liquid saturated hydrocarbons including the open chain, cyclic, and alkyl-substituted cyclic saturated hydrocarbons such as pentane (e.g. isopentane), hexane, heptane, various normally-liquid petroleum hydrocarbon fractions, cyclohexane, the alkylcyclohexanes, and decahydronaphthalene.

Unreacted monomeric reagent oftentimes can be recovered from the reaction product by conventional techniques such as by heating said reaction product under reduced pressure. In one embodiment of the process of the present invention, the poly(ethylene oxide) copolymer product can be recovered from the reaction product by washing said reaction product with an inert, normally-liquid organic diluent, and subsequently drying same under reduced pressure at slightly elevated temperatures.

In another embodiment, the reaction product is dissolved in a first inert organic solvent, followed by the addition of a second inert organic solvent which is miscible with the first solvent, but which is a non-solvent for the poly(ethylene oxide) copolymer product, thus precipitating the copolymer product. Recovery of the precipitated copolymer can be effected by filtration, decantation, etc., followed by drying same as indicated previously. Poly(ethylene oxide) copolymer will have different particle size distributions depending on the processing conditions. The poly(ethylene oxide) copolymer can be recovered from the reaction product by filtration, decantation, etc., followed by drying said granular poly(ethylene oxide) copolymer under reduced pressure at slightly elevated temperatures, e.g., 30° C. to 40° C. If desired, the granular poly(ethylene oxide) copolymer, prior to the drying step, can be washed with an inert, normally-liquid organic diluent in which the granular polymer is insoluble, e.g., pentane, hexane, heptane, cyclohexane, and then dried as illustrated above.

Unlike the granular poly(ethylene oxide) copolymer which results from the suspension polymerization route as illustrated herein above, a bulk or solution copolymerization of ethylene oxide and a silane- or siloxane-functionalized glycidyl ether monomer yields non-granular resinous poly(ethylene oxide) copolymer which is substantially an entire polymeric mass or an agglomerated polymeric mass or it is dissolved in the inert, organic diluent. It is understood, of course, that the term "bulk polymerization" refers to polymerization in the absence of an inert, normally-liquid organic diluent, and the term "solution polymerization" refers to polymerization in the presence of an inert, normally-liquid organic diluent in which the monomer employed and the polymer produced are soluble.

The individual components of the polymerization reaction, i.e., the epoxide monomers, the catalyst, and the diluent, if used, may be added to the polymerization system in any practicable sequence as the order of introduction is not crucial for the present invention.

The use of the alkaline earth metal catalyst described herein above in the polymerization of epoxide monomers allows for the preparation of exceptionally high molecular weight polymers. Without being bound by theory it is believed that the unique capability of the alkaline earth metal catalyst to produce longer polymer chains than are otherwise obtained in the same polymerization system using the same raw materials is due to the combination of higher reactive site density (which is considered activity) and the ability to internally bind catalyst poisons. The poly(ethylene oxide) copolymers of the present invention have a weight average molecular weight equal to or greater than 100,000 daltons and equal to or less than 10,000,000 daltons.

With the higher molecular weight polymers, viscosity measurements are complicated because of the difficulties encountered in dissolving the polymers in aqueous systems. During dissolution the mixture assumes a mucous-like consistency with a high tendency to gel. In addition, the extremely long chains are quite sensitive to shearing forces and must be stirred under very low shearing conditions in order to minimize mechanical degradation. The procedure for dissolving the polymers of the present invention may be found in Bulletin Form No. 326-00002-0303 AMS, published March 2003 by the Dow Chemical Company and entitled "POLYOX™ Water-Soluble Resins Dissolving Techniques". The solution viscosity values that are recited throughout this application refer to solutions of ethylene oxide copolymers that are prepared according to the procedure set forth in the example.

The term "1% aqueous solution viscosity" as used herein means the dynamic viscosity of a 1 weight % solution of the polymer in a mixture of water and isopropyl alcohol in a weight ratio of about 6:1. The weight percentage of polymer is based on the weight of water only, i.e., not including the isopropyl alcohol. Preparing the aqueous solutions of the polymers the isopropyl alcohol is added first in order to allow the polymer particles to disperse as individuals before water is added. This seems to greatly minimize gel formation and provides reliable viscosity measurements. The 1% aqueous solution viscosity of the ethylene oxide polymers according to the present invention is preferably greater than 1,200 mPa·s at 25° C. and less than 20,000 mPa·s at 25° C. The 1% aqueous solution viscosity of the ethylene oxide polymers is determined at 25° C. using a BROOKFIELD™ DV-II+digital viscometer. The BROOKFIELD guard leg is in place when making the measurement. RV spindle #2 and a speed of 2 RPM are employed to make the measurement. The spindle is immersed in the polymer solution, avoiding entrapping air bubbles, and attached to the viscometer shaft. The height is adjusted to allow the solution level to meet the notch on the spindle. The viscometer motor is activated, and the viscosity reading is taken 5 mm after the viscometer motor is started.

The poly(ethylene oxide) copolymers are particularly suitable as flocculation agents for suspensions of particulate material, especially waste mineral slurries. The poly(ethylene oxide) copolymers of the present invention are particularly suitable for the treatment of tailings and other waste material resulting from mineral processing, in particular, processing of oil sands tailings.

EXAMPLES

Preparation of Modified Calcium Hexammine Catalyst

The modified calcium hexammine catalyst is prepared as disclosed in WO 2013116027: A semi-continuous stirred tank reaction system is utilized to produce a calcium based catalyst using parallel processing. A K-Tron single screw loss in weight gravimetric solids feeder (model # KCL-24-KQX) feeds calcium metal to a lock hopper. The lock hopper is made up of two 1" Kitz ball valves. The lock hopper is operated as follows: A charge of approximately 2.5 g of calcium is fed on top of the top lock hopper ball valve. The top ball valve is opened, allowing the calcium metal charge to fall into the lock hopper. The top lock hopper valve is immediately closed and the lock hopper is purged with nitrogen gas to remove any traces of oxygen. Upon completion of the nitrogen purge of the lock hopper, the bottom valve is opened and the calcium metal charge is dropped into the liquid ammonia contained in the agitated dissolver vessel. The dissolver vessel is maintained at a temperature range of −10° C. to 0° C., and a pressure of 482 to 515 kPa (55-60 psig). Calcium metal is fed in multiple charges over the duration of the reaction in order to maintain an appropriate liquid level in the dissolver vessel. Each calcium charge is immediately followed by the addition of sufficient liquid ammonia to maintain a calcium concentration of approximately 2 mol %. The resulting reaction of calcium metal and liquid ammonia is formation of calcium hexammine, dissolved in liquid ammonia. The calcium hexammine solution is continuously transferred into the modifier vessel, at a controlled rate using a variable speed peristaltic pump. Simultaneously, a mixture of 60 mol % propylene oxide and 40 mol % acetonitrile is added to the modifier vessel. The propylene oxide/acetonitrile mixture is added to the agitated modifier vessel at a rate targeting 1 mol total propylene oxide/acetonitrile for 1 mol of calcium hexammine flowing in from the dissolver vessel. Reaction of the calcium hexammine with the propylene oxide/acetonitrile mixture produces a gray/white precipitate suspended in liquid ammonia. The resulting slurry is continuously pressure transferred from the modifier vessel to the agitated stripper vessel. The modifier vessel is maintained at a temperature of −5° C. to 5° C. and a pressure of 446 to 482 kPa (50-55 psig). The stripper vessel is charged with approximately 1000 mL of NORPAR13™ hydrocarbon (dodecane/tridecane/tetradecane mixture) prior to initiation of the reaction. The slurry formed in the modifier vessel is continuously transferred to the stripper vessel over the duration of the reaction. The stripper is maintained at a pressure of 377 to 411 kPa (40-45 psig) and a temperature of 0° C. to 40° C. Upon completion of the reaction all flows are terminated, and the stripper vessel pressure is lowered to 129 kPa to 136 kPa (4-5 psig). The stripper is heated at approximately 3° C./min to a maximum temperature of 215° C. The slurry is maintained at 215° C. for 3 hours. Upon completion of the thermal treating, the stripper is cooled and the catalyst slurry recovered. The resulting slurry is the catalyst source for the polymerization of ethylene oxide to produce poly(ethylene oxide) copolymer.

Preparation of Modified Zinc Alkoxide Catalyst

A zinc alkoxide catalyst is prepared guided by the description provided in USP 6,979,722. A 250 mL flask is set up in an inert atmosphere glove box and charged with ISOPAR™ E (isoparaffinic fluid, CAS 64741-66-8) (80 mL) and diethyl zinc (5.0 mL, 48.8 mmol). To this solution, 1,4-butanediol (3.5 mL, 39.5 mmol) is added drop wise with vigorous stirring. A white precipitate is formed immediately. The solution is stirred at room temperature for 1 hour, heated to 50° C. for 1 hour, and then stirred overnight at room temperature. The following day ethanol (3.7 mL, 63.4 mmol) is dripped into the solution. The solution is then heated to 40° C. for 1 hour, followed by heating to 150° C. for 1 hour. At this temperature, volatile components from the solution (including some of the ISOPAR E) are distilled off. After cooling, the final slurry volume was adjusted to 120 mL with ISOPAR E, to give a zinc concentration of 0.4 M. This catalyst preparation is used in the described polymerization reactions, and is subsequently described as "zinc alkoxide catalyst." The catalyst is always kept in an inert atmosphere glove box, and solutions for use in the polymerization reactions are also prepared in the glove box. Catalyst solutions are sealed in serum-type vials for transport to the reactor and are delivered to the reaction solution by syringing out of the sealed vials and injecting into the sealed reactor in order to minimize air exposure.

Polymerization of Poly(Ethylene Oxide) Copolymer

One or more of the following comonomers is used in Examples 1 to 12:

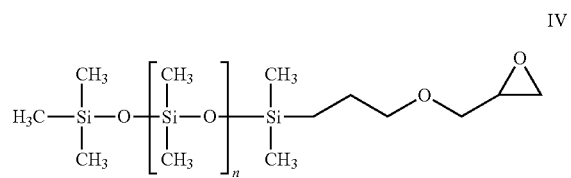

3-glycidyloxypropyl polydimethy siloxane "GPPDMS" wherein n is 0 to 50,

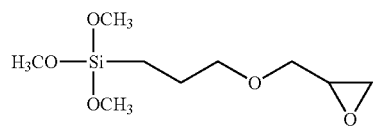

3-glycidyloxypropyl trimethoxysilane "GPTMS",

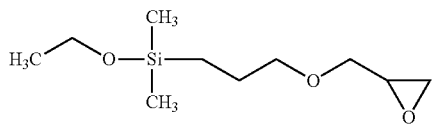

3-glycidoxypropyldimethylethoxysilane "GDPMES", and

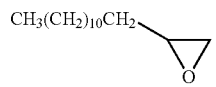

1,2-epoxy tetradecane "ETD".

Examples 2, 5, and 6

The following procedure is followed to make the poly (ethylene oxide) copolymers of Examples 2, 5, and 6: An 800 mL resin kettle with jacketed 500 mL working volume is equipped with nitrogen inlet, dry ice condenser, dry ice jacketed addition funnel, mechanical stirrer and temperature probe. The reactor is under nitrogen and vented through a 5% $H_3PO_4$ solution alligator scrubber.

A slurry of 0.33 g of dried hydrophobic silica in about 50 mL of hexane is prepared in a dry box. This is prepared in a glass serum jar and then crimped, sealed and taken out of the dry box.

The calcium catalyst is weighed out into a syringe inside the dry box. The syringe is sealed and taken out of the dry box. At the same time, a syringe is weighed out with the silane- or siloxane-functionalized glycidyl ether monomer. The reactor is charged with the about 500 mL degassed, anhydrous cyclohexane using a double tipped needle transfer line from the Schlenk type round bottom flask. The slurry of 0.33 g of dried hydrophobic silica in about 50 mL of cyclohexane is added via syringe to the reactor. Agitator is turned on at 300 rpm.

A dry ice/isopropanol slush is prepared in the condenser jacket of the addition funnel. The addition funnel temperature is maintained at about −20° C. The reactor jacket circulation turned on with a set point of 20° C. The oxygen level in the reactor is measured at about 2.7 ppm. Transfer about 45 mL of ethylene oxide to the addition funnel. The ethylene oxide is received from Arc Specialties in a cylinder and transferred via ⅛" stainless steel tubing as a liquid to the addition funnel. Add the catalyst in the syringe to the reactor. Add silane- or siloxane-functionalized glycidyl ether monomer to the reactor. Add ethylene oxide at a fast rate over about 5 minutes while watching the reaction slurry exotherm. The jacket temperature set point is 20° C. Exotherm to 28.8° C. After the addition is complete, heat the bath to 35° C. for 1.5 hours. Cool to 20° C.

Add 3.0 g of 100% isopropanol. Allow this to stir for 1 hour. Bubble in $CO_2$ for 1 hour. Let stir for 1 hour. Filter the polymer in air. Wash with 50 g of cyclohexane. Dry polymer at 35° C. for 2 hours. Place the poly(ethylene oxide) copolymer in a sample jar. Add 400 ppm butylated hydroxy toluene (BHT) to stabilize it. The type and amount in grams "g" of silane- or siloxane-functionalized glycidyl ether monomer, type and amount in g of catalyst "Cat", and percent yield for Examples 2, 5, and 6 are given in Table 1.

Examples 1, 3, 4, 7, and 12

The following procedure is followed to make the poly (ethylene oxide) copolymers of Examples 1, 3, 4, and 7 to 12: A 2 L reactor system is dried at least 13 hours by heating up to 120° C. with a nitrogen sweep and cooled. The 2 L reactor is jacketed with a heat bath of silicone oil, −20° C. ethylene glycol bath cooled condenser, mechanical stirrer, using temperature and pressure sensors and Siemens control system. The reactor is under nitrogen and remains under pressure during the run. The percent ethylene oxide in the reactor is calculated by the computer based off temperature and pressure and a base calculation.

The reactor is charged with about 700 mL isopentane supplied from a 20 pound cylinder via nitrogen to pressure transfer it. A slurry of 1.2 g of dried hydrophobic silica in about 50 mL of hexane, is prepared in a syringe and transferred into the reactor through the septum load port. Agitation is set to about 700 rpm and the system is set to heat in the Reaction Preheat step to bring the contents to a minimum of 32° C. and maximum of 47° C. before proceeding.

A minimum of 100 g of ethylene oxide is transferred to the ethylene oxide charge pot from the cylinder supplied by Arc Specialties using pressure from an ultra dry nitrogen cylinder dedicated for this purpose.

Once the temperature of the system has reached a steady state and is in Cascade mode, 28 grams of ethylene oxide is pressure transferred to the reactor using the system's ethylene oxide precharge step. The ethylene oxide concentration is expected to be about 5 wt %.

A syringe is weighed out with the desired amount of silane- or siloxane-functionalized glycidyl ether monomer and added to the reactor through the septum addition port.

The catalyst is weighed out into a syringe from a sealed serum bottle that is filled in the dry box. Add the catalyst in the syringe to the reactor. A digestion period is given for about 1 hour to allow the reaction to start.

The start reaction step is advanced on the system to add the remaining target of 72 g (100 g total) ethylene oxide at a rate over about 20 to 100 grams/hour. The system is monitored and readings are taken periodically during the addition of the ethylene oxide. If the ethylene oxide concentration exceeds 7 wt %, the ethylene oxide addition is stopped or more catalyst is added. More catalyst is added unless deemed to not be reacting and the batch is then halted and allowed to proceed to the next step.

After the addition is complete, the system is held for about 1 hour or until the ethylene oxide concentration is below 1 wt %. The reaction mixture is cooled to 20° C.

1.5 mL of 100% of isopropanol is added and the reaction mixture is stirred for 1 hour. Added $CO_2$ to the reactor headspace for 30 mm while the system is cooling.

The 2 L reactor is removed from the system and the solids are filtered through a fritted funnel. The reaction product is washed with about 500 mL of hexane. The polymer is dried at ambient temperature under full vacuum over night. The yield is determined for each reaction. 500 to 900 ppm BHT is added to each poly(ethylene oxide) copolymer. The type and amount in grams "g" of silane- or siloxane-functionalized glycidyl ether monomer, type and amount in g of catalyst "Cat", and percent yield for Examples 1, 3, 4, and 7 are given in Table 1.

Examples 8 to 12

The following procedure is followed to make the poly (ethylene oxide) copolymers of Examples 8 to 12: A glass 2 L reactor equipped with a condenser system, ethylene oxide (EO), feed line, over head stirrer, and septum sealed port for catalyst addition, is dried overnight under a nitrogen flow at elevated temperature. After cooling, the inerted reactor is charged with 700 mL of isopentane and 1.5 g of hydrophobically modified silica and equilibrated to 38° C. and 89.6 kPa (13 psi). An ethylene oxide precharge of 40 g is added to the reactor, followed by injection through the septum port of 6 mL of the 0.4 M zinc alkoxide catalyst slurry prepared as described herein above. A syringe is weighed out with the desired amount of silane- or siloxane-functionalized glycidyl ether monomer and added to the reactor through the septum addition port. Ethylene oxide is continuously fed into the reactor until 100 g total is added. The rate of ethylene oxide addition is adjusted so that the calculated vapor phase concentration of ethylene oxide will stay below 7 wt. %. More catalyst is added unless deemed to not be reacting and the batch is halted and allowed to proceed to the next step. After 268 mm, 15 mL of isopropyl alcohol are charged into the reactor and the reactor is cooled. The solid polymer product is isolated by filtration, dried in a vacuum oven over night at room temperature, and stabilized with 500 ppm BHT. The type and amount in grams "g" of silane- or siloxane-functionalized glycidyl ether monomer, type and amount in g of catalyst "Cat", and percent yield for Examples 8 to 12 are given in Table 1.

Viscosity Characterization

1% aqueous solution viscosity "1% vis" is determined according to the procedure disclosed herein above for each Example and reported in units of centipoise (cP) in Table 1.

TABLE 1

| Ex | Comonomer | Comonomer, %/g | Cat | Cat, g | Yield*, % | 1% vis, cP |
|----|-----------|----------------|-----|--------|-----------|------------|
| 1  | GPPDMS    | 10/9.8082      | Ca  | 4.571  | 93        | 10,060     |
| 2  | GPPDMS    | 10/5           | Ca  | 2.77   | 63        | 15,020     |
| 3  | GPPDMS    | 5/4.9651       | Ca  | 3.2838 | 101       | 12,120     |
| 4  | GPPDMS    | 15/15.2719     | Ca  | 3.6267 | 109       | 9,400      |
| 5  | GPDMES    | 10/4.7         | Ca  | 2.71   | 64        | 7,180      |
| 6  | GPTMS     | 10/5           | Ca  | 3.15   | 71        | 560        |
| 7  | GPPDMS ETD | 5/5.6476 5/5.2414 | Ca | 5.204 | 100      | 5,580      |
| 8  | GPPDMS    | 10/10.9215     | Zn  | 7.8996 | 91        | 9,740      |
| 9  | GPPDMS    | 5/5.5887       | Zn  | 6.0447 | 97        | 11,100     |
| 10 | GPPDMS    | 15/15.3027     | Zn  | 6.7332 | 94        | 11,020     |
| 11 | GPTMS     | 10/10.8459     | Zn  | 15.7681| 99        | 80         |
| 12 | GPPDMS    | 10/9.819       | Zn  | 18.5851| 94        | 4,280      |

*Yields may be greater than 100% because of the presence of residual catalyst and hydrophobically modified silica - only monomers are used for yield calculation.

Flocculant Evaluation

Tailings samples to be used for flocculation evaluation of Examples 1 and 3 to 12 are prepared by combining process water and raw tailings in a sample jar based on total solids content of raw mature fine tailings (MFT) sample obtained by drying a sample in an oven to generate a 30 wt. % solids content stock sample of MFT in process water. Mix the tailings sample jar well using an overhead impeller. Continue mixing the tailings sample while sub-samples are taken for subsequent testing. Add 95 mL of diluted tailings into a recycling in-line static mixer utilizing a set of static mixer elements and peristaltic pump, and begin circulation at a pump speed of 200 rpm for 60 seconds; the pump speed results in tubing velocity of 65 cm/s and loop flow rate of 1240 mL/min. Then dose in a 0.4 wt % solution of the poly(ethylene oxide) copolymer in process water via a syringe pump tied into the in-line mixing system over 80 seconds. After dosing, continue mixing to give a total of 185 mixer element passes; 92 mixer element passes during polymer injection, 93 mixer element passes after polymer addition where a twisted-ribbon element is used. Samples are then tested for Capillary Suction Time (CST) and a Settling Test.

CST Test:

Obtain 15 mL sample from mixer and place into capillary suction test cell. Record advancement of water front on CST paper over time. CST time to 15 cm is recorded as a measure of permeability of the treated tailings sample. The CST results for Examples 1 and 3 to 12 are shown in Table 2.

Settling Test:

Obtain 80 mL sample from mixer and place into 100 mL graduated cylinder. Record change in solids level versus overall liquid level over time. After 18 hours, calculate the solids content of the settled tailings from recorded water level and solids level. Water quality in separated water layer is determined visually in relation to its clarity with high being most clear and low being less clear and medium in between (H, L, and M, respectively). The settling test results for three different dosage levels, 600 ppm, 1200 ppm, and 1800 ppm for Examples 1 and 3 to 12 are provided in Table 2.

TABLE 2

| Ex | Dosage level, ppm | CST, min | Average Solids, % | Water Clarity |
|---|---|---|---|---|
| 1 | 600 | 113 | 33 | — |
|  | 1,200 | 34 | 45 | — |
|  | 1,800 | 23 | 45 | — |
| 3 | 600 | 75 | 37 | M |
|  | 1,200 | 26 | 44 | H |
|  | 1,800 | 21 | 43 | M |
| 4 | 600 | 82 | 35 | M |
|  | 1,200 | 22 | 45 | M |
|  | 1,800 | 17 | 44 | H |
| 5 | 600 | 81 | 27 | — |
|  | 1,200 | 20 | 30 | M |
|  | 1,800 | 14 | 35 | M |
| 6 | 600 | 126 | 29 | — |
|  | 1,200 | 75 | 40 | H |
|  | 1,800 | 41 | 43 | H |
| 7 | 600 | 90 | 32 | M |
|  | 1,200 | 24 | 43 | H |
|  | 1,800 | 20 | 44 | M |
| 8 | 600 | 88 | 33 | M |
|  | 1,200 | 22 | 45 | H |
|  | 1,800 | 12 | 46 | H |
| 9 | 600 | 98 | 33 | H |
|  | 1,200 | 23 | 45 | H |
|  | 1,800 | 20 | 45 | H |
| 10 | 600 | 78 | 33 | M |
|  | 1,200 | 23 | 45 | H |
|  | 1,800 | 19 | 45 | H |
| 11 | 600 | 134 | 26 | — |
|  | 1,200 | 80 | 29 | M |
|  | 1,800 | 21 | 41 | H |
| 12 | 600 | 63 | 36 | H |
|  | 1,200 | 24 | 45 | H |
|  | 1,800 | 16 | 45 | H |

What is claimed is:

1. A method of dewatering an aqueous suspension of particulate material comprising the steps of:

i. adding to an aqueous suspension of particulate material a poly(ethylene oxide) copolymer which is the reaction product of polymerizing from 95 to 5 weight percent ethylene oxide and from 5 to 95 weight percent silane- or siloxane-functionalized glycidyl ether monomer, based on a total weight of the poly(ethylene oxide) copolymer, in the presence of a zinc alkoxide catalyst or a modified alkaline earth hexammine catalyst wherein the silane- or siloxane-functionalized glycidyl ether monomer is described by one or more of the following structures:

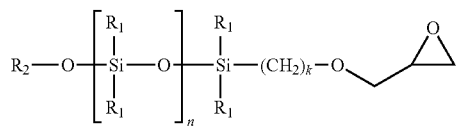

wherein $R_1$ is —$CH_3$ or —$OCH_3$,
   $R_2$ is —$CH_3$ or —$CH_2CH_3$ or —$Si(CH_3)_3$
   k is equal to 1 to 4,
   and
   n is equal to 1 to 50;

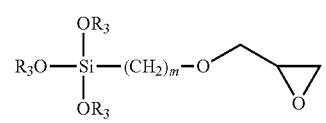

wherein $R_3$ is —$CH_3$ or —$CH_2CH_3$
   and
   m is equal to 1 to 4;
   or

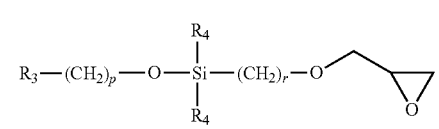

wherein $R_3$ and $R_4$ are independently —$CH_3$ or —$CH_2CH_3$,
   p is equal to 0 to 2,
   and
   r is equal to 1 to 4;

ii. after adding the poly(ethylene oxide) copolymer, allowing the aqueous suspension of particulate material with the poly(ethylene oxide) copolymer to flocculate; and iii. after allowing the aqueous suspension of particulate material with the poly(ethylene oxide) copolymer to flocculate, dewatering the aqueous suspension of particulate material.

2. The method of claim 1 wherein the modified alkaline earth hexammine catalyst is a modified calcium hexammine catalyst.

3. The method of claim 1 wherein the aqueous suspension of particulate material comprises tailings and other waste material resulting from the mineral processing of phosphate, diamond, gold, mineral sands, zinc, lead, copper, silver, uranium, nickel, iron ore, coal, oil sands, or red mud.

4. The method of claim 1 wherein the aqueous suspension of particulate material comprises tailings and other waste material resulting from the mineral processing of oil sands.

* * * * *